Patented July 30, 1935

2,009,987

UNITED STATES PATENT OFFICE 2,009,987

RESINOUS CONDENSATION PRODUCT

Carleton Ellis, Montclair, N. J., assignor to Ellis-Foster Company, a corporation of New Jersey No Drawing. Original application January 28, 1924, Serial No. 689,165. Divided and this application September 21, 1932, Serial No. 634,256

9 Claims. (Cl. 260—3)

This invention relates to certain synthetic products of use in the arts made from urea by reaction with other materials as will be hereinafter described and relates particularly to products which may be cast, molded, machined or otherwise treated to make shaped articles and also to varnishes, lacquers, paints and enamels containing such synthetic products. It is especially an object of the invention to obtain light colored or white articles or material which are not readily discolored by light or heat.

This invention is concerned with the reaction products of urea or equivalent substance with formaldehyde or equivalent substance and an acid body or in some cases an alkaline or basic substance followed by an acid body.

This application is a division of application, Serial No. 689,165, filed January 28, 1924, entitled "White synthetic resin and process of making same". In that case there is claimed the urea-formaldehyde type condensation products, particularly when produced in an acid medium or with an acid catalyst in at least one stage of their production, and methods for obtaining such condensation products. In the instant case, there is particularly claimed resinous compositions characterized by the presence of resinous phenol-methylene and urea-methylene derivatives, as well as methods of producing such products and carrying out the condensation reaction involving urea and formaldehyde type materials under a more than atmospheric pressure.

The preparation of for example a casting mix may be carried out as follows. Urea, preferably alcohol refined to give a pure white product, is dissolved in aqueous formaldehyde solution; the ordinary formalin containing 37 to 40 per cent of $CH_2O$ preferably being employed. To 20 parts by weight of urea 54 parts of the formalin solution may be used.

The urea and formaldehyde are caused to react by the addition of a catalyst e. g. an alkaline substance may be used as a primary catalyst. For this purpose caustic alkali may be used and in the proportion of .4 part dissolved in an equal weight of water. As reaction takes place the mixture heats and eventually becomes turbid. Preferably the reaction is checked at the first appearance of turbidity by the addition of a mild acid or other suitable neutralizing agent. Acetic acid may be used. The neutral solution will keep for an indefinite time and may be used for making casting mixes. The setting of this solution for casting and molding is brought about by the addition of an acid preferably a strong acid such as hydrochloric or phosphoric, oxalic and the like. Acid salts such as bisulphate or aluminum chloride also may be used. Glycerine, casein, gelatine, Irish moss, algin and other modifying or tempering agents may be added. The reaction mixture may be colored or tinted any shade and the white form may be suitably colored in delicate shades or to represent ivory etc. The foregoing white product resembles porcelain in outward appearance when freshly cast and may be used for receptacles, handles, knobs, ornaments, paper weights, and a multiplicity of other purposes. The term casting is used herein although a molten substance not necessarily is poured. The term embraces also a liquid product or solution which sets and takes the shape of a mold, as if molten material had been used.

The addition of a few drops of hydrochloric acid to a considerable bulk of the neutral solution suffices to start the reaction forming the final or ultimate substance which causes the whole liquid to thicken and form a homogeneous coagulum which gradually hardens until of surprising hardness. The product appears perfectly homogeneous in spite of the large amount of water in the formalin. The proportion of urea and formalin may be varied. The amount of final acid catalyst to use varies with the strength of the acid and the amount added. The mixture heats on addition of the final catalyst an setting may be retarded to some extent by cooling. Enough catalyst should be present to cause a good degree of setting but not so rapidly as to preclude the addition of fillers, when desired, and the pouring of the mixture into molds of plaster of Paris, glass, copper or other materials. Any filler not neutralizing the acid may be used. Plaster of Paris and china clay, silex ground quartz, titanium oxide and the like may be used for white or porcelain-like articles. Any suitable pigment or dye may be added. Organic fillers such as flock or wood flour may be used. Asbestos also may be incorporated.

When white articles are not desired the urea may not be as good a quality, the formaldehyde may be a brown commercial grade and alkaline catalysts may be used throughout in some cases. Alkalies tend to turn the color of the urea-formaldehyde reaction product over to a brown. Strong alkali in excess may prevent solidification entirely. An acid substance as the final catalyst is best when a snow-white product is required. An acid catalyst may be used throughout in some cases.

The amount of filler added varies with its bulk and usually should not exceed the weight of the organic binder formed by the reaction. Without a filler a high gloss or finish is usually obtained.

The casting may be allowed to stand in the mold a sufficient length of time to become hard enough to handle. This may take from a few minutes to a half hour or longer. The article is then removed and may be exposed to the air freely for a time to allow superficial drying and elimination of formaldehyde odor. This exposure may take place at room temperature or a somewhat elevated temperature. If the water is expelled from the product it becomes transparent and glassy and very hard. A specimen after exposure at ordinary temperature for a week or so could not be decisively scratched by apatite (No. 5 in the scale of hardness) but was scratched, although not easily and deeply, by orthoclase (No. 6). The material does not burn resembling bone or ivory. When thin films or chips are held in a flame they do not ignite but swell and finally char. Cast masses may be turned, bored or otherwise machined, to form cigarette holders, pipe bowls and stems, knife handles, beads etc. The solution may be applied to surfaces where it dries and forms a varnish. Layers of cloth or paper may be cemented with the neutral solution of the reaction product described and reacted to a tenacious binder by heating in a press or clamped together in an oven. Fillers may be impregnated with the aforesaid neutral solution (urea and formaldehyde reacted with an alkali to incipient turbidity, then neutralized) and dried to form a molding powder especially to make white molded articles.

Another phase of the reaction is as follows. The amount of water present in ordinary aqueous formaldehyde causes a considerable degree of shrinkage in the molded articles which takes place after removal from the mold and allowing the material to stand for sometime. A high proportion of filler sometimes is necessary to overcome this. This drying out and shrinkage is objectionable when it causes fissuring or splitting, unless the material is to be powdered and molded, and in the present invention I described methods of employing paraform and reducing or eliminating the water so that shrinkage is not so noticeable. When casting sheets or slabs of the material which may be seasoned, that is exposed to the air or in an oven for a considerable time to dry out, the degree of shrinkage is very noticeable when using a formaldehyde solution of about 40 per cent strength, that is, commercial marmalin. However such sheets or slabs may be dried out very carefully in this manner and then being machined into pipe stems, cigarette holders, buttons and the like. On the other hand cast articles which have to possess a much less degree of shrinkage I find may be advantageously produced from paraform or a mixture of paraform and aqueous formaldehyde solution.

A desirable way of introducing paraform is to add enough basic material to bring about rapid solution in the small amount of water which is present. Urea is very soluble in water while paraform is relatively insoluble. In order to produce a homogeneous product it is desirable to have the paraform in solution. The addition of caustic alkali brings about reaction between the paraform and urea with spontaneous heating and the coarse lumps of paraform gradually disappear on shaking until finally a practically clear solution is obtained. This may be filtered or if the action of the alkali is such as to cause further reaction to an extent that is undesirable the solution may be treated with acetic acid or other acid to just neutralize. The neutral solution can be kept for hours or days without serious change provided enough water is present. On the addition of strong acid such as hydrochloric, sulphuric, phosphoric or oxalic acid, or of milder acid substances such as sodium bisulphate and certain organic acids a reaction takes place with the evolution of heat and the clear liquid sets to a clear gelatinous mass rapidly turning white until it becomes almost a pure white solid material apparently of homogeneous structure, opaque and resembling ivory or in its whitest form appearing like porcelain. The amount of acid and the character of the acid greatly modify the speed of setting. The amount of water present in the mixture also modifies the rate. Thus it is possible to add the acid catalyst to the mixture and thoroughly incorporate it and still have time sufficient in which to pour the liquid into a mold before it sets. Even when the reaction takes place in a few minutes or seconds there is ordinarily no evolution of gases which cause a spongy product such as is characteristic of many resinifying reactions. The mass quietly sets to a transparent jelly which soon becomes opaque but there is no disturbance of the setting mass by the evolution of gases. A strong clear white product of uniform texture is thus obtained without molding under pressure. The material obtained may be turned or machined in any desired manner. Even when made with paraform some water is present and it is desirable to allow the articles to dry out for a time or season to obtain a product of good hardness and toughness. The drying may take place at room temperature or at elevated temperatures as for example 50 to 60° C. or even higher as the drying progresses.

Mixtures which may be used are the following:

1. 100 grams each of urea, paraform and water are mixed. The paraform does not dissolve. 5 c. c. of aqueous caustic soda solution of about 40 per cent strength are added and on further shaking for a time the paraform goes into solution. Then 10 c. c. of a 10 per cent solution of hydrochloric acid are added to react with the caustic soda so that its action may not be so pronounced. At this point the solution may be filtered to remove any dust or dirt or any hard lumps of paraform which may have escaped solution. 20 c. c. of 10 per cent hydrochloric acid are then added and stirred in thoroughly and the solution poured into a mold. It sets in a few minutes and after an hour or so may be removed from the mold and allowed to dry.

2. 100 grams each of urea and paraform, 50 c. c. of water, 5 c. c. of caustic soda solution as aforesaid and 30 c. c. of hydrochloric acid of 10 per cent strength are mixed in a similar manner. The reaction is a very rapid one and molding must be conducted promptly or the mass will set beyond the point where it can be properly cast. A very hard white product is obtained.

3. 118 grams of urea, 100 grams of paraform and 50 c. c. of ordinary formalin solution are mixed and 5 c. c. of the caustic soda solution of 40 per cent strength added. Finally hydrochloric acid is added gradually to acidify and bring about setting of the mass.

4. 100 grams each of urea and paraform, 20 c. c. of water and 5 c. c. of the caustic soda solution were mixed and allowed to react to produce a clear solution, then neutralized with glacial acetic acid to exact neutrality. 10 c. c. of glacial acetic acid were added without causing setting. Finally 20 c. c. of 10 per cent hydrochloric acid were added in portions and the mixture heated up indicating reaction was starting. At this point the solution which already had begun to thicken was poured into the mold and it quickly solidified.

Various fillers may be added to the solution before pouring. The addition of fillers reduces shrinkage difficulties and is recommended. Fillers as a rule impart the glossiness of the surface of the cast article and not infrequently modify the strength usually decreasing it when the filler is in powdered form and acting beneficially when of a fibrous nature. Wood flour is a very desirable filler but has the disadvantage that it colors the mass a yellowish tone. White asbestos may be used, also cotton flock, silk flock etc. When castings of other colors than white are desired the filler may be of a corresponding color or the solution may be dyed. A tiny amount of blue dye improves the whiteness of the castings.

There are the usual mineral fillers—whiting, barytes, gypsum, zinc oxide, lithopone, china clay and the like which may be employed. Plaster of Paris acts as a dehydrating agent as well as a filler. Opacity may be rendered more permanent by the addition of a small amount of filling material. Luminous zinc sulphide or radium paint powder may be incorporated. Portland cement and similar hydraulic cements may be added. The white product itself may be applied to concrete or masonry to form a white enamel coating.

When made of good quality raw materials very clear transparent hard products are obtained which may be used for making lenses or goggles and various other applications where a transparent non-inflammable substance is desired free from the dangerous qualities of nitrocellulose. Other articles which may be made are handles for tools and surgical instruments, knives, umbrella handles, toothbrush handles and the like. It may be used for producing door knobs, bathroom fixtures etc. For toilet articles such as the back of hand mirrors and brushes the material also may be cast to suitable shape. When well mixed with filler it may be cast or impressed upon a phonograph mold to produce a phonograph record, the surface of the record only need be of the methylol urea compound. A suitable backing of other composition or of cardboard etc. may be employed to reduce the cost. Spheres such as billiard balls and the like may be produced from the hardest grades of the material.

A good method of procedure in judging the degree of reaction between urea and the formaldehyde, paraform or other aldehyde employed is to permit the reaction between the two substances, as for example urea and paraform, to progress in the alkaline medium to the point where particles begin to precipitate and at that instant arrest the action by the addition of acetic or other acid to approximate neutrality. If the alkali is allowed to react beyond a certain point the whole mass may solidify to a magma or white pasty substance which cannot be used advantageously for casting although it may be dried out and used in certain hot-pressing operations. Therefore before the liquid starts to thicken with separation of the reaction product the liquid is neutralized. Thereafter the acid catalyst may be added in such proportion, with or without cooling, as may be desired with reference to speed of setting.

Methylol urea may be used alone or in conjunction with various natural or synthetic resins or resin-forming substances, with or without fillers or extending and coloring agents.

Either the monomethylol urea or the dimethylol urea may be used singly or in admixture or their appropriate derivatives may be utilized, e. g. substituted ureas acting in a similar or equivalent manner. The term urea is employed here to embrace carbamide and appropriate derivatives.

Thus dimethylol urea or mixtures of this substance with some monomethylol urea are preferred. When dimethylol urea is heated it melts somewhere in the neighborhood of 120° C. but on further heating for example 20 or 30 degrees higher reaction takes place and a substance is formed which is quite infusible at the temperature at which it is produced and may be heated to a considerably higher temperature before softening or carbonization occurs. For example it may be heated nearly 100 degrees above its hardening point before it begins to show signs of decomposition. This property of heat-setting or becoming thermo-rigid makes possible the use of the material in or as a basis of molding compounds which under heat and pressure become solidified or consolidated to a shaped mass. Molded articles may be obtained which are firm, strong and more or less heat resistant.

In the molding field there is desired not necessarily a perfectly infusible resin or binder but one which on solidifying at the molding temperature is sufficiently firm at that temperature to be removed from the molding press while still hot and be handled and exposed without deformation or loss of surface lustre. The labor cost in molding is so great that the few minutes time required to cool the mold in the production of plastics from fusible resins which do not harden or become thermo-rigid represents a considerable item in the total cost of manufacture. Hence the desirability of a resin not necessarily infusible but which will sufficiently harden in the mold at the molding temperature.

Dimethylol urea is suitable for this purpose on account of its hardening property, the differential or spread in temperature between the melting point and the point at which it decomposes under strong heating is sufficiently great that even though not wholly infusible it is capable of meeting the demand for a labor-saving molding compound of this general character.

It is not necessary to employ pure dimethylol urea but the crude substance, contaminated with various other bodies, may be used in many cases. It is however desirable to heat the crude dimethylol urea for a period to thoroughly dry it and remove as far as possible any substances which might evolve gases in the mold. Thus dimethylol urea was baked 18 hours at 120° C. A white product was obtained which was placed in a mold in powdered form and molded at 300° F. under a pressure of 1000 pounds and higher. A white solid article was obtained which had a glossy surface and which when placed in a Bunsen flame did not melt but burned slowly with carbonization.

Desirable combinations may be made with various synthetic resins as for example by incorporation with a fusible phenol-formaldehyde resin. Such a mixture on heating in the mold yields a heat-resisting urea compound. A product of this character will set sufficiently in hot pressing to be useful in molding operations. The reaction is a complex one, the urea compound probably forming the substance $C_5H_{10}N_4O_3$ in part and also probably reacting with the phenol formaldehyde product to a certain extent. In place of phenol, cresol, naphthol and other reactive bodies are not excluded. Acetaldehyde also may be used with, or in some cases in substitution for, formaldehyde.

An example is the following. 210 parts by weight of phenol and 150 parts of aqueous formaldehyde were placed in an autoclave and heated for 2 hours raising the pressure as quickly as possible to 100 pounds and maintaining this pressure during the reaction. This called for a temperature of 138 to 143° C. After the reaction was complete the water which had separated from the resinous mass that had formed was removed. The dry resin was fusible and was completely soluble in alcohol. 1 part by weight of well dried dimethylol urea was incorporated with 10 parts by weight of this phenol formaldehyde resin and on heating was found to set to a product of substantially higher melting point than the original mix.

On adding larger proportions of the dimethylol urea up to approximately an equal weight of the fusible phenol formaldehyde resin various modified complex substances could be obtained on hot pressing at temperatures between 125 and 150° C. These products ranged from ones which on hot pressing increased in melting point only slightly to complexes which had a very decided increment in melting point.

Another type of molding composition is made from a binder comprising dimethylol urea and a resin obtained by reacting with furfural on phenol. For example furfural is mixed with several times its volume of phenol or cresol, an excess of the phenolic body being used and this is treated with a small amount of hydrochloric acid. The latter may be aqueous hydrochloric acid or preferably alcohol saturated with the gas. Hydrochloric acid reacts on furfural very violently and the tendency is to form a black rubbery-like substance which is insoluble and infusible and without any useful properties in that condition. When only a small amount of phenol is present such as would be required solely for the reaction with furfural the tendency also is to produce the infusible rubbery substance. An excess of phenol however which may be removed at the close of the reaction by steam distillation or in any other suitable manner permits of the formation of a fusible furfural resin which is then capable of being incorporated with fillers or extending agents. The amount of hydrochloric acid used need not be large preferably when kept down to a few per cent there is less danger of forming an infusible product. The reaction may be allowed to take place advantageously at about 80° C. A fusible resin having been obtained in this manner may be incorporated with dimethylol urea in various proportions. Thus a major proportion of the furfural resin may be used in some cases while in others it is desirable to use an excess of the dimethylol urea. As the plastic substance obtained is darkened by the furfural resin the composition is best adapted for use in making brown or black molding compounds.

It may be added that furfural resin made as above with an excess of phenol may also be incorporated with other substances as for example paraform or hexamethylenetetramine. Such compositions have the property of hardening when heated and they may if desired be incorporated with dimethylol urea in any proportions desired.

A suitable composition is made from fusible furfural phenol resin and dimethylol urea in the proportions of 3 parts of the former to 1 part of the latter. In this case no hexamethylenetetramine or formaldehyde derivative of such a character is introduced.

2 parts of the furfural phenol resin to 1 part of dimethylol urea may likewise be intimately mixed and if desired 10 per cent of hexamethylenetetramine may be added. Preferably however as indicated no hexamethylenetetramine or similar substance is employed.

Sometimes it is a distinct advantage in the recovery of the molding material to have a resin or binder which does not become entirely infusible. In molding there is a considerable amount of wastage and if this waste material is infusible it cannot be used again to advantage. On the other hand if still fusible even though at a higher temperature than that used in molding it is possible to utilize it by suitably fluxing it.

Still another composition is that made by reacting on furfural with aniline hydrochloride. For example 1 part of aniline hydrochloride is dissolved in 2½ parts of furfural and is very gently heated and incorporated with dimethylol urea. Care should be taken to avoid any increase of the temperature which forms an infusible compound prematurely.

Still another composition is that involving a mixture of dimethylol urea and monomethylol urea incorporated in various proportions as for example equal parts by weight. While this material may be used by itself for molding purposes it may also be admixed with the fusible phenol formaldehyde resin for example as above described or with a furfural phenol resin or a furfural aniline resin. The proportions used being for example equal parts or compositions containing more of one constituent than the other.

Dimethylol urea also may be incorporated with phenol sulphur resins made by reacting on phenol with sulphur chloride. For example 1 part by weight of phenol is treated with 2 to 2¼ parts of sulphur monochloride to yield a resin. This resin may be incorporated with 10 per cent and upwards of dimethylol urea.

Dimethylol urea also may be incorporated with a resin obtained by reacting on acetone or other ketone with formaldehyde.

Dimethylol urea may be incorporated with natural resins such as shellac and copal resin. Thus cracked Congo resin as "run" by heat treatment in the manufacture of varnishes may be utilized. Also bodies of the nature of asphaltum or gilsonite may be used.

Various fillers or extending agents as indicated may be employed for example mineral fillers gypsum, whiting, mica, infusorial earth, clay and asbestos or organic fillers such as cotton flock, wood pulp, saw dust, wood flour, cork, leather scrap etc.

Molding compounds may be made by mixing such fillers as for example equal parts of filler and binder to form molding powders. The filler may be simply ground with the binder or may be impregnated by means of a solution. Or the materials may be incorporated and worked out into sheeted form. This may be accomplished by mixing on differential rolls and then running through sheeting rolls.

Paper or cloth may be impregnated and sheets pressed together to form blocks. The binding agent in the form of a solution may be used as a lacquer or incorporated with filler may be employed as a cement.

Shaped articles made under heat and pressure in accordance with the foregoing may be defined or characterized by containing a heat-set urea derivative.

The following subject matter relates especially to the use of organic acids in lieu of mineral acids for carrying out the reaction. While mineral acids do not enter into combination, at least to any material extent, some of the organic acids appear to enter into combination yielding a resinous complex of modified properties. In the foregoing I have mentioned the use of dibasic acids such as oxalic acid in carrying out the reaction. The employment of other acids such as lactic, succinic, tartaric, citric, malic and other acids in the aliphatic series, and benzoic, salicylic, acetyl salicylic, phthalic acid and the like in the aromatic series and their corresponding anhydrides is feasible.

The description which follows is especially concerned with phthalic acid or anhydride.

When urea, phthalic anhydride and aqueous formaldehyde are mixed and heated in an open flask a milky liquid at first appears but on continued heating, preferably by boiling, the solution gradually clarifies and a thin transparent syrup is formed which on cooling becomes heavy bodied. Fifteen minutes to one hour boiling usually suffices to bring about this conversion. The heavy bodied syrup thus obtained will on long standing sometimes, for example in a few days' time, show some separation of a whitish solid substance.

The syrup obtained in this way has the curious property of being soluble in or miscible with organic solvents such as methyl or ethyl alcohol or better with a ketone such as acetone. This solubility or miscibility has certain limits as too great an addition of for example acetone will give a white precipitate. Also if diluted with water a white precipitate will form in some cases when a certain dilution is reached.

For ordinary purposes the syrup may be diluted with an equal volume of acetone. This provides a solution which may be used as a varnish or impregnating medium. A coating of this material slowly hardens on exposure to air and much quicker on baking. Thus the solution may be applied to metal surfaces and the articles baked in order to produce a hard transparent coating.

When urea and formaldehyde are caused to react without an acid as for example by simple heating together a product is obtained which is very quickly discolored at high temperatures. The same is true when urea and formaldehyde are caused to react in the presence of a base, such as an alkali or hexamethylenetetramine. Such products seem to be rather sensitive to heat at temperatures above 100° and tend to turn yellow or brown. In attempting to mold such products discoloration is likely to occur. With the phthalic product a marked resistance to discoloration by heating is noted. This is important in making white articles which retain their color on baking or molding in a hot press.

(A) A preferred mixture is made by boiling together 15 parts of urea, 15 parts of phthalic anhydride and 60 parts of ordinary aqueous formaldehyde of 37 to 40 per cent strength. The mixture may be boiled in an open flask for 12 to 15 minutes or longer if necessary to bring about clarification. The use of a reflux condenser is not always desirable because it may tend to cause the syrup to deposit a heavier precipitate of white material on standing. However suitable arrangements may be made such as an ordinary condenser (not refluxing) to collect any distillate and recover formaldehyde. In some cases the heating may be carried out in an autoclave under pressures above atmospheric.

(B) Another mixture is made by heating 50 parts each of urea and phthalic anhydride and 150 parts of aqueous formaldehyde. This product is not as readily miscible with acetone.

(C) Another product was obtained by heating 10 parts by urea, 20 parts of phthalic anhydride and 60 parts of aqueous formaldehyde. This product is somewhat more miscible with acetone than in the case of (B) and has slightly better keeping qualities.

(D) 20 parts of urea, 10 parts of phthalic anhydride and 60 parts of aqueous formaldehyde were mixed and boiled with the object of producing a clear solution but only a milky syrup could be obtained. This product was less readily incorporated with acetone.

(E) 20 parts urea, 50 parts phthalic anhydride and 50 parts aqueous formaldehyde were boiled together. When hot a pasty white product resulted which thickened somewhat on cooling.

A thick layer of syrup (A) was dried at 50° C. until the material could be removed from the drying pan and cut into various shapes such as strips, cubes and the like. These articles when air dried for 3 or 4 weeks were found to be clear and glass-like. Sheets of material made in this way, or by longer baking if desired, may be used as substitutes for window glass in making wind shields. The material may be ground to form lenses for eye glasses or optical intruments. Sheets of the material also may be used in making goggles. Longer baking especially with gradually increasing temperature keeping at all times below the temperature at which bubbles or fissures due to expansion of moisture or gases form yields products more resistant to water, solvents and the like.

Thus for making transparent articles adapted as substitutes for those various uses for which glass is now employed slow drying or baking is preferred to bring about the conversion to a heat-resistant insoluble product. On the other hand the product is very sensitive to higher temperatures when in the initial syrupy or soluble form and may be very quickly transformed into an infusible product by heating to 110–130° C. without discoloration. This enables various molding compositions and molded articles to be obtained as will be subsequently described.

Clear glass-like material also has been obtained by vacuum drying up to a temperature of 90° C. An infusible product may be obtained in this manner.

Aqueous solutions generally tend to thicken and set to a solid pasty mass in the course of time. When thinned with acetone however the solutions show a much greater permanency which is desirable for many applications.

Acetone will mix in the cold with a syrup such as is obtained according to Example (A). Alcohol however does not mix as well and it is better to add this solvent to the freshly prepared warm syrup. In this way a solution is obtained which on cooling does not show separation at least for some time.

The phthalic-urea complex made in this way when not baked or exposed to any high degree of heat is soluble in furfural. It is also soluble in phenol. The latter will dissolve even the baked material in many cases. A solution of the well dried resinous complex may be dissolved in furfural and a solution of nitrocellulose and acetone admixed with it to give a clear product.

Various tests were made with the syrupy material such as described in Example (A) as a binder for the customary fillers employed in the plastic molding art with the object of producing molded articles which were heat resistant. Thus 50 parts by weight of syrup (A) were mixed with 100 parts of asbestos fibre and dried in a vacuum to 90°, then ground and pressed for 10 minutes in a hydraulic press at 110° C. An infusible heat-resistant molded article was obtained having a good glossy surface, slightly gray in color due to the asbestos employed.

In another case equal parts of syrup (A) and wood flour were well mixed and dried in a vacuum dryer up to 75° C. When placed in the hot press and molded at 110° C. the molded article was found to be unsatisfactory because of what is termed overcuring. Another mixture in the same proportions was dried up to 50° C. in a vacuum dryer until the moisture was removed and then ground. Finally it was air-dried for 4 hours. On pressing in a hydraulic press at 110° C. for 10 minutes, pressure of 3000 pounds a light yellow translucent hard tough molded article was obtained.

No mold lubricant was required. The molded article leaving the hot mold freely without sticking. A temperature of 110° C. is a relatively low one for molding purposes and was used in the present case in order to give as favorable results as possible in regard to light color. The temperature of molding may however be increased with consequent increase in speed of setting or curing in the mold to produce an infusible article which may be taken from the mold without necessity of cooling.

A number of tests on the urea-phthalic compound show the phthalic acid or anhydride combines to a very large extent in the complex so that free phthalic acid or anhydride is not present especially when the composition is made up according to certain proportions such for example as specified in (A). In the latter case tests of the partially dried and also the heat-set material showed phthalic acid absent when carrying out the test according to the procedure given by Mullikan. Higher proportions of phthalic anhydride for example that given in Example (E) which was not a particularly satisfactory product showed a considerable amount of phthalic anhydride to be present.

In addition to phthalic anhydride or phthalic acid other organic acids both monobasic, dibasic and polybasic may be used. Including acids of both aliphatic and aromatic series and the following illustrates the results obtained with a series of such acids.

In the following series the acid is used in the proportion of 1 part by weight to 1 part of urea and 4 parts of aqueous formaldehyde of 40 per cent strength. The data first indicates the results obtained on boiling the ingredients together for 5 minutes and also the setting or hardening effect produced by heating a portion of each of the samples under like conditions on a hot plate to determine the comparative rate of setting and make observations on any discoloration brought about by the action of heat.

(1) Benzoic acid. White opaque syrupy liquid containing much crystalline material. Hardens readily on heating on hot plate. Fairly white product.

(2) Citric acid. The mixture effervesces on heating giving a perfectly clear syrup. Rapidly hardens on heating on hot plate with slight yellowing.

(3) Acetic anhydride. The reaction is exothermic and a clear white jelly is obtained. On heating on hot plate a snow white infusible glossy mass resulted.

(4) Propionic acid. Very mild reaction. Solution white but not syrupy. Slight turbidity. On heating on the hot plate a transparent hard white mass is obtained.

(5) Gallic acid. On heating the ingredients together a clear thick syrupy solution formed which on cooling became clouded and slightly yellowish. A hard glossy yellowish resin was obtained by heating on the hot plate.

(6) Lactic acid. The solution is clear, water white and syrupy. On the hot plate the material hardens to a resin of yellowish cast.

(7) Maleic acid. Yields a slightly yellow thin syrup free from sediment however when heated on the hot plate a spongy brownish mass is obtained which is rather weak.

(8) Salicylic acid. A water white syrup with some white crystalline matter results. When this product is heated on the hot plate a tough snow white resin readily forms.

(9) Tartaric acid. When the ingredients are heated together effervescence is observed and a clear solution not particularly syrupy results. Heating on the hot plate gives a fairly tough resin of a pure white color.

(10) Acetyl salicylic acid. On heating the ingredients a very thick syrup formed which could be changed to a transparent jelly. This reacted very quickly on the hot plate to produce a clear transparent resin. The rate of hardening or curing is notably rapid.

(11) Oxalic acid. With this acid a clear rather thin light colored syrup was obtained which on heating on the hot plate set to a hard mass.

(12) Mucic acid. A white syrup with much white solid matter resulted on reacting the materials together. When exposed on the hot plate a white resin resulted which was considerably tougher than that obtained with maleic acid.

(13) Tannic acid. A yellow solution was obtained passing through a syrupy stage to thin jelly which was yellowish brown and transparent. On heating a dark brown resin resulted. The time of curing on the hot plate was fairly brief.

(14) Trichloracetic acid. The reaction in this case was vigorous and in 3 minutes time a jelly was produced. On standing the jelly became opaque but along the walls of the vessel films of the material were flexible and transparent. The reaction takes place without the formation of bubbles and this acid is suggested for use in connection with the manufacture of sheets resembling glass and similar products. On the hot plate a white resin resulted which appeared to have considerable elasticity.

(15) Stearic acid. The reaction in this case is poor and much separation occurs. The product obtained on the hot plate is opaque but appears to be lacking in strength.

Among the uses for the product of the present invention is in the varnish, lacquer, paint and enamel industry, as an impregnating material, for hat stiffening and as a cement. It may be used in substitution for glass for various purposes such as lenses, wind shields, revolving doors etc. In making imitation gems, beads, cigarette and cigar holders, pipe stems, umbrella and cane handles, fountain pens, billiard balls, ash trays, phonograph records, camera parts, grinding wheels, gears, artificial amber, insulation, white or light colored molded articles, buttons, ink stands, ornamental articles, dishes etc. It may be reinforced by the use of appropriate wire netting or by sheets of paper or cloth. Or articles may be built up of impregnated sheets of fibrous material pressed together in a hot press.

"Non-breakable" glass formed by cementing two panes of glass together by the urea-phthalic derivative. Careful baking to avoid bubbles serves to harden the cementing agent.

The material of the present invention may be mixed with other substances such as resins, nitrocellulose, or other cellulose esters or ethers, with shellac solutions, either aqueous or alkaline, and the like.

The syrupy material may be poured out in pans and allowed to set and harden preferably baking at 50 to 60° C. thereby obtaining sheeted material which may be stamped into the form of dishes, ash trays, parts of toys and the like.

Having thus set forth my invention I claim:

1. The herein described resin composition characterized by freedom from uncombined phenols, and by the presence of resinous phenol-methylene and urea-methylene derivatives.

2. The herein described resin composition characterized by freedom from uncombined phenols, and by the presence of resinous phenol-aldehyde and urea-methylene derivatives.

3. A composition containing a resinous pressure condensation product characterized by freedom from uncombined phenols and by the presence of resinous phenol-methylene and urea-methylene derivatives.

4. A resinous composition characterized by the presence of a phenol-furfural derivative and urea-methylene derivatives.

5. A resinous composition characterized by the presence of resinous furfural condensation products in a urea-formaldehyde type condensation product.

6. The process for the manufacture of resinous condensation products characterized by freedom from uncombined phenols and by the presence of resinous phenol-methylene and urea-methylene derivatives, wherein the condensation is conducted under a more than atmospheric pressure.

7. A reaction complex of an aldehyde-urea condensation product with a phenol-formaldehyde condensation product.

8. A reaction complex of an aldehyde-urea condensation product with a phenolic resin.

9. A complex containing reaction products of urea, formaldehyde, and a phenolic derivative.

CARLETON ELLIS.